United States Patent [19]

Lederman

[11] Patent Number: 5,636,720
[45] Date of Patent: Jun. 10, 1997

[54] MOLDABLE ROLLER CLUTCH CAGE WITH FULL SUPPORT POCKETS

[75] Inventor: Frederick E. Lederman, Sandusky, Ohio

[73] Assignee: General Motors Corporation, Detroit, Mich.

[21] Appl. No.: 563,742

[22] Filed: Nov. 29, 1995

[51] Int. Cl.$^6$ .............................................. F16D 41/067
[52] U.S. Cl. ........................................ 192/45; 192/113.32
[58] Field of Search ................................ 192/45, 113.32; 384/560, 576

[56] References Cited

U.S. PATENT DOCUMENTS

| | | | |
|---|---|---|---|
| 2,977,164 | 3/1961 | Witte | 384/576 |
| 3,387,901 | 6/1968 | Williams | 384/576 |
| 3,917,036 | 11/1975 | Johnson et al. | 192/45 |
| 4,054,192 | 10/1977 | Johnson | 195/45 |
| 4,054,340 | 10/1977 | Broshkevitch et al. | 384/576 |
| 4,679,676 | 7/1987 | King et al. | 192/45 |
| 4,712,661 | 12/1987 | Lederman et al. | 195/45 |
| 4,714,803 | 12/1987 | Lederman | 192/41 R |
| 4,787,490 | 11/1988 | Lederman et al. | 195/45 |
| 4,830,157 | 5/1989 | Lederman | 192/45 |
| 4,850,463 | 7/1989 | Lederman | 192/45 |
| 4,875,564 | 10/1989 | Leitz et al. | 192/45.1 |
| 4,995,489 | 2/1991 | Lederman et al. | 192/45 |
| 5,007,514 | 4/1991 | Hattori et al. | 192/45 |
| 5,042,628 | 8/1991 | Malecha | 192/45 |
| 5,048,651 | 9/1991 | Lederman | 192/45 |
| 5,052,518 | 10/1991 | Trommer | 192/113.32 X |
| 5,056,636 | 10/1991 | Lederman | 192/45 |
| 5,062,512 | 11/1991 | Lederman | 192/45 |
| 5,183,139 | 2/1993 | Malecha | 192/45 |
| 5,273,144 | 12/1993 | Papania | 192/45 |

FOREIGN PATENT DOCUMENTS

2145013  3/1972  Germany ................................. 384/576

*Primary Examiner*—Rodney H. Bonck
*Attorney, Agent, or Firm*—Patrick M. Griffin

[57] ABSTRACT

A roller clutch cage includes two mirror image sections that press fit together to create a series of roller pockets with full profile side rails that fit closely between the races, filling up essentially the entire radial space between the races. The side rails and cross bars that form the pockets are radially solid and uninterrupted, providing full load support between the races. Each cage section is designed to be by pass molded, with slots in the cross bars that also give the cage both contractive and expansive flexibility. The cage flexibility allows it to be installed easily, and also allows it to conform better to and between the races during clutch operation. While the radially uninterrupted and complete side rails retain lubricant around the rollers more completely, the slots allow it to drain in a controlled manner.

2 Claims, 7 Drawing Sheets

MOLDABLE ROLLER CLUTCH CAGE WITH FULL SUPPORT POCKETS

This invention relates to roller clutch cages in general, and specifically to a roller clutch cage that can be simply molded from only two integral pieces, and in which the cage closely conforms to the profile of the clutch races, thereby providing full, solid support to maintain the races concentric.

BACKGROUND OF THE INVENTION

One way roller clutches typically include a cage that provides the basic structural foundation for the clutch. The cage includes a series of circumferentially spaced roller pockets, formed by axially spaced, annular side rails interconnected by axially extending cross bars, each of which pockets contains an individual roller and spring. The cage is installed by various techniques between a cam race and a coaxial pathway race. The pathway race, which is often, though not always, the inner race, has a simple cylindrical surface or pathway, on which the rollers freely roll and on which the cage pilots. The cam race is more complex, and includes a series of circumferentially spaced, asymmetrically V shaped notches, separated from one another by semi cylindrical, co radial bearing surfaces. Each V or saw tooth shaped notch has a long, shallow angled side sloping in one direction, called a earn ramp, against which a spring loaded roller is continually urged by an individual spring that pushes off the cage. The selective wedging or jamming of the rollers against the cam ramps locks the races together when they attempt to relatively rotate in one direction, but allows free wheeling in the other relative direction. Each notch also has a much shorter and steeper, oppositely sloped side, sometimes called a cam hook, which simply provides a quick surface transition back down to the adjacent semi cylindrical bearing surface. Since the cam hook has no necessary function per se, other than to serve as a transition from one surface to another, it could, theoretically, have any shape that was practical to machine. It is typically flat, however.

A use has been found for the cam hook in terms of how the cage is installed to, and properly oriented relative to, the cam race. Cage installation to the cam race is an operation that is generally carried out before the pathway race is pushed coaxially inside of the cam race. A common cage to cam race assembly method is the so called "twist lock" technique, detailed in co assigned U.S. Pat. No. 4,712,661. The plastic cage is molded with radially outwardly extending reaction ears that are short enough to pass through the peaks of V shaped notches, thereby allowing the cage to be freely pushed axially inside the cam race. The cage position that allows this pass through is angularly offset from the cage's final position. After pass through, the cage is then twisted back to its final installation position, causing a sloped surface of the reaction ears to abut the cam hooks. As the cage is twisted back, a flat face of the reaction ears simultaneously slides over and "locks" to the outside faces of the cam race, which prevents the cage from shifting axially on the cam race. The inner pathway race is added last by the so called "ringing on" method, with an axial push and simultaneous twist in the same direction that the cage was twisted. This compound motion of the pathway race causes the cylindrical pathway to concurrently roll all of the rollers slightly up the cam ramps, that is, toward the cam hooks, thereby compressing the roller springs. Afterward, the force of the compressed springs pushing the rollers off of the cage and against the cam ramps also continually pushes the reaction ears back against the cam hooks, thereby keeping the cage in its proper angular orientation on the cam race. Clearly, an absolute requirement of the twist lock technique of cage installation is that the profile of the outer edges of the cage side rails not closely match the profile of the V shaped notches. If it did, then there would the enough cage clearance to allow the cage to pass through the cam race in an angularly offset orientation.

Other methods of installing, orienting, and retaining the cage to the cam race do exist, such as that disclosed in co assigned U.S. Pat. No. 4,995,489, in which the cage is molded with a shape that causes it to twist itself automatically as it is pushed onto the cam race. Another method is shown in co assigned U.S. Pat. No. 5,062,512, in which the cage is pushed straight in without a twist, but has a special design that allows it to effectively shrink in circumference and then re expand so as to snap into a central groove in the cam race and retain itself without reaction ears. In both designs, however, there is significant radial clearance between the cage and the cam ramps. A full profile cage, that is, one in which the outer edges of both side rails of the cage closely matched the exact shape of the cam ramps with little or no clearance, would inherently have to be installed with just a simple, straight on push fit, with no angular offset or twisting. As such, a separate means, such as snap rings, might have to be used to retain the cage to the race, which is obviously not preferred over a self retaining cage.

Another function of the cage, beyond acting as a framework to hold the rollers and springs, is to keep the races radially spaced apart during clutch operation in a near coaxial relation, sometimes referred to as concentricity control. This is typically accomplished by providing arcuate sections in the cage, known as beating blocks, that pilot on the pathway and closely fill the radial space between the pathway and the semi cylindrical portions of the cam race. The bearing blocks keep the races concentric, or, at least, limit the degree of running eccentricity to an acceptable level. The beating blocks should be radially solid, or nearly so, in order to provide good load support between the races. When a clutch is designed with more rollers and cam ramps within a given circumference, in order to give it a higher torque capacity, the interstitial space between the cam ramps that is available for bearing blocks inevitably becomes narrower, limiting the load support that beating blocks can provide. An alternative for providing concentricity control would be a full profile cage, that is, a cage having axially opposed side rails with outer edges that closely matched the entire profile of the cam race, as well as an inner edges that piloted closely on the pathway. If full profile cage side rails could also be made radially solid and uninterrupted, then they could provide a large measure of the inter race load support that bearing blocks typically provide. In addition, such solid, full profile cage side rails, if they could be practically manufactured, would provide stronger roller pockets with better resistance to impact from the ends of the rollers. Another possible benefit would be improved retention the lubricant that is often pumped between the cage side rails through feed holes bored through the pathway race. Full profile, small clearance pocket side rails would do a better job of keeping the lubricant around the rollers, reducing wear. Lubricant retention is poor if there is a large radial clearance between the edges of the cage side rails and the race surfaces. Enhanced lubricant retention for typical large clearance cages must currently be provided with extra seals added on to the cage, as is shown in co assigned U.S. Pat. No. 4,714,803.

The real world impediments to making a hypothetical roller clutch cage with full profile, radially solid side rails are many, in terms of manufacturing, installation, and clutch operation after assembly. As far as manufacturing, it is almost a requirement now that cages be plastic injection moldings, and, preferably, one piece moldings made by the so called axial draw or by pass molding method. In a cage designed to be produced by the pass method, only two axially parting molds, with no internal inserts or radially moving slides, are sufficient to form the entire cage. There are many existing cage designs that achieve that objective, one of which can be seen in co assigned U.S. Pat. No. 4,712,661, a basic design that is repeated and modified in many other patents. The hallmark of all one piece, by pass moldable cage designs is cage side rails that are not radially continuous or solid, so that they do not radially overlap or block the opposite side rail as viewed in the axial direction. To achieve that basic relationship, one side rail must occupy less than the entire radial space between the races, while the opposed side rail occupies the remainder of that radial space, or some portion of the remainder. In contrast, radially solid, full profile cage side rails would completely radially overlap, and it would be physically impossible to by pass mold them with two axially parting molds. To make a plastic cage with radially solid side rails would require either that it be molded in one piece with inserts and slides, or that it be molded in multiple pieces that were assembled together after molding. One such multi-piece cage is shown in co assigned U.S. Pat. No. 4,054,192, in which each pocket is separately molded and then snapped together like links in a bracelet. This, of course, maximizes the possible number of separate pieces, which is not a desirable option for ease of manufacture or assembly. Even that design, however, cannot provide full profile side rails, because it, too, relies on the twist lock cage assembly technique described above. The other option for solid, strong, full profile cages is to provide two stamped metal side rails that are held together by separate cross rails, as shown in co assigned U.S. Pat. No. 4,787,490. Even with this design, the side rails do not conform very closely to the cam profile. The reason for this is that there is no circumferential flex or give in metal side rails, so a true full profile, closely conforming side rail could bind up on the cam race during cage installation, if tolerances in the side rail shape were only slightly off.

Another problem with a true full profile cage side rail, even if it were to be made of more flexible plastic, is the temperature expansion and contraction differential that exists between plastic and the metal clutch races during clutch operation. Some provision should be provided to allow the plastic cage to compensate by expanding and contracting, so as to conform itself to the metal clutch races. Cage side rails that were simply the plastic equivalent of full profile metal side rails would not be able to expand and contract freely. Several one piece, by pass molded cage designs do include structural features that allow temperature differential compensation. These are typically slots or other relieved areas that allow the pockets to flex back and forth relative to one another. Examples may be seen in co assigned U.S. Pat. Nos. 4,712,661, 4,830,463 and 4,850,463. None of these designs, however can have full profile, radially solid cage side rails, because of the very fact that they are one piece by pass moldings.

To summarize, what the plethora of existing cage designs outlined above fails to provide in a single design is a plastic roller clutch cage with strong, full profile, radially solid side rails, which is by pass molded and easily assembled with a minimal number of pieces (meaning two), which can be easily installed to the cam race after assembly without binding, which retains itself to the cam race after it is installed, and which will conform itself after installation to the races.

SUMMARY OF THE INVENTION

The invention provides a roller clutch cage that meets the lengthy list of desired features noted above in a relatively simple design.

The preferred embodiment of the invention can be best conceptualized by first defining a circumferentially spaced series of imaginary volumes between the races called wedging spaces, four sides of which constitute the entire radial space between the races. Two sides of each wedging space are circumferentially extending, axially opposed, and generally arcuate in shape, with a profile matching both the V notches of the cam race and the pathway. The other two sides are axially extending, circumferentially opposed, and straight, each lying on radial planes that bisect the semi cylindrical portions of the cam race. The cage design provides four sided roller pockets, each of which substantially fills and encloses a wedging space, thereby providing full support between the races, as well as improved lubricant retention around the rollers.

In the embodiments disclosed, the cage includes a pair of substantially mirror imaged cage sections that are assembled together to make a complete cage. Each cage section includes a series of circumferentially spaced, radially solid side rails with outer edges that closely match the shape of the cam race. The inner edges of the side rails match the diameter of the pathway. The cage side rails are interconnected by axially extending cross bars, each of which is centered on and has a radial thickness equal to a straight side of the wedging space. Each cross bar is radially solid, but is circumferentially interrupted by an axial slot that runs as far as a solid end lug. The slot assures that the cage section surfaces have no mutual radial overlap, so that each cage section can be integrally by pass molded. Finally, suitable latch means are molded to each cross bar end lug, which are engageable with the opposed cage section, When the two cage sections are pushed axially together, they are secured together so that the axially opposed side rails and cross bars form a series of complete, four sided roller pockets. In addition, in the embodiments disclosed, the cross bar end lugs have short, radially outwardly extending barbs that correspond to a shallow annular groove or grooves machined into the cam race.

After the two cage sections are molded and assembled to complete the cage, the cage is installed inside the cam race with a simple axial push, assisted by a guide ring. In the embodiments disclosed, the cross bar slots allow the cage to effectively contract as it is installed to the cam race, thereby allowing the barbs to snap out into the cam race groove for self retention. The outer edges of the full profile side rails conform closely to the cam ramps and cam hooks, and the outer edges of the cross bars conform closely to the semi cylindrical portions of the cam race. After the pathway race is installed, the inner edges of both the side rails and the cross bars pilot closely on the pathway. The wedging spaces around the rollers are fully enclosed and fully filled. Therefore, during operation, the races are fully supported in coaxial relation, the rollers are well retained and guided, and any lubricant entering the pockets is effectively retained around the rollers. The cross bar slots also provide operational advantages, in addition to their manufacturing and installation advantages. They allow the cage to effectively expand or contract so as to accommodate itself to the races with differential temperature effects. They also can act as a controlled drain to allow excess lubricant to exit the pockets.

DESCRIPTION OF THE PREFERRED EMBODIMENTS

These and other features of the invention will appear from the following written description and from the drawings, in which.

Figure 1:
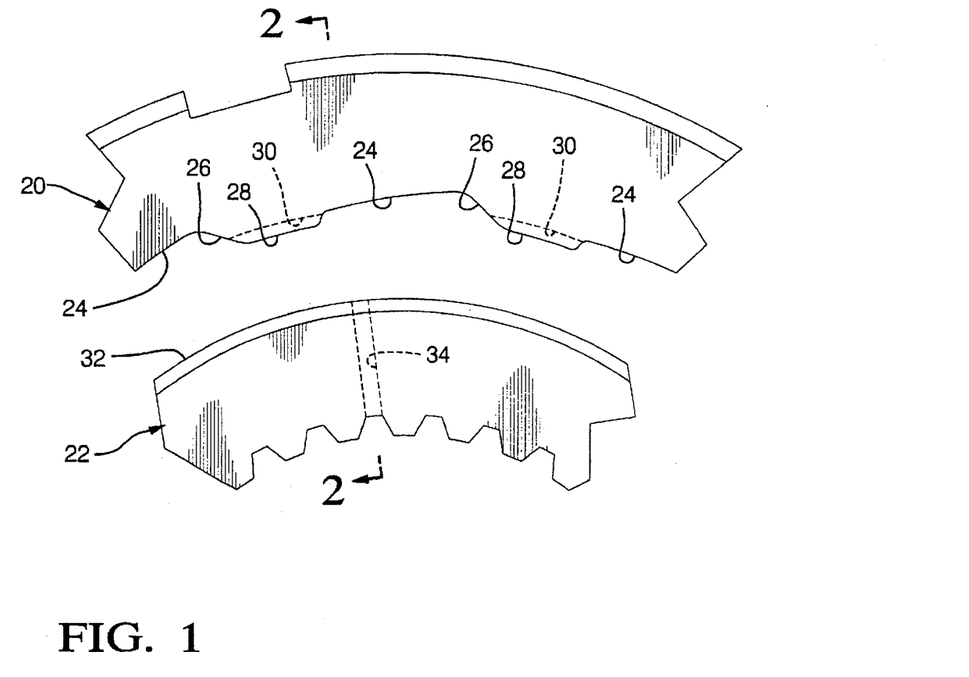
FIG. 1 is a axial view of an arcuate segment of a coaxial cam race and pathway race, with no roller clutch cage yet installed between them.
Figure 2:
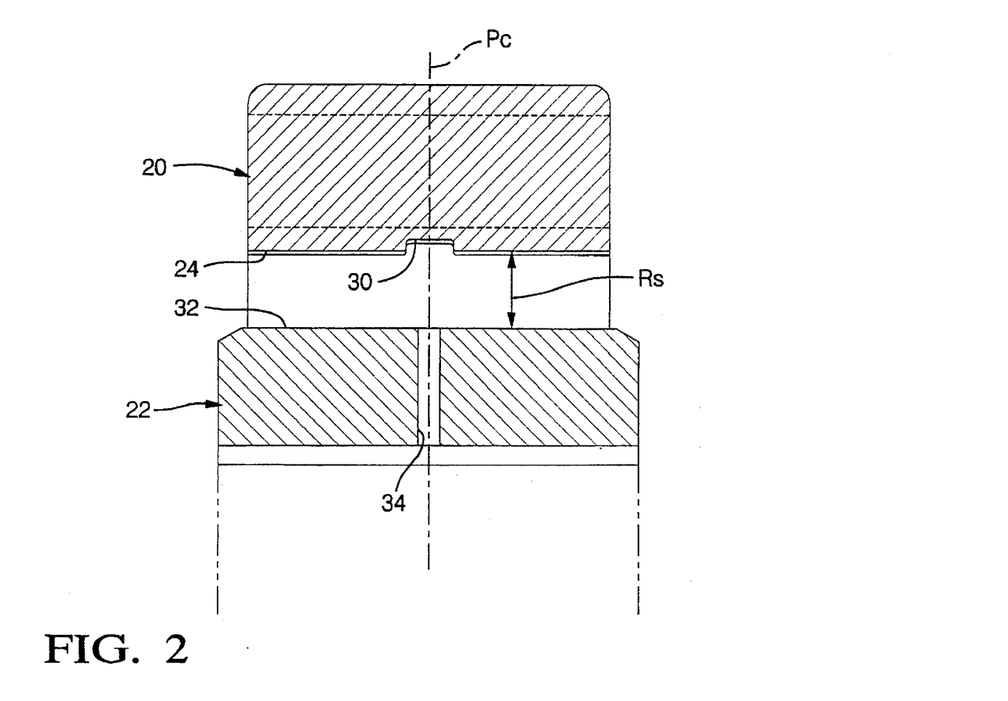
FIG. 2 is a cross section of the races taken in the plane represented by the line 2—2 in FIG. 1.
Figure 3:
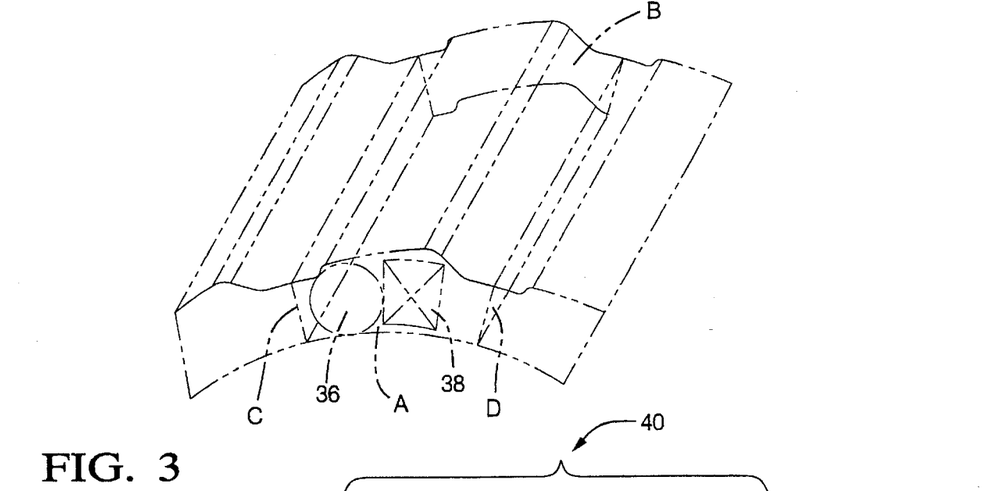
FIG. 3 is a three dimensional schematic of the empty annular space between the races of FIG 1.

Referring first to FIGS. 1–3, a pair of coaxial clutch races, an outer cam race, indicated generally at 20, and an inner pathway race, indicated generally at 22, are annular steel rings with respective radially opposed surfaces that form an annular space therebetween. Cam race 20 has the more complex surface, including a circumferentially spaced series of shallow, clockwise sloping cam ramps 24 and, shorter, steeper, oppositely sloped cam hooks 26, which together create a series of asymmetrical V, or saw tooth, shaped notches. These notches are separated by semi cylindrical beating surfaces 28, which lie on a common cylindrical surface with a predetermined diameter. In the embodiment disclosed, the center of each beating surface 28 is cut by a shallow semi circular groove 30, all of which lie on a common circle and on a central plane perpendicular to the co axis, indicated at Pc. The pathway race 22 is far simpler, having a simple cylindrical pathway 32 interrupted only by lubricant supply holes 34, of which there would be an evenly circumferentially spaced number, such as four. The pathway 32 faces the cam race bearing surfaces 28 with a constant radial separation Rs, when the races 20 and 22 are coaxial. Stated conversely, if the radial separation Rs can be maintained, then the races 20 will be maintained coaxial. As seen in FIG. 3, the empty volume between the coaxial races 20 and 22, shown in dotted lines, can be conceptualized as a circumferentially spaced series of adjacent wedging spaces, each bounded on four sides A–D. The sides A and B are parallel, axially opposed and spaced apart by the basic axial thickness of the cam race 20. The sides A and B are generally arcuate in shape, with a profile defined by both the v shaped notches and the pathway 32. The sides C and D are circumferentially opposed, and substantially parallel, since they lie on radial planes that bisect the center of the cam race beating surfaces 28. The sides C and D have an axial length equal to the axial thickness of cam race 20, and a radial thickness equal to Rs. Although they are arbitrary constructs, the wedging spaces as defined are a useful conceptual tool, since they each contain and surround an individual pair of roller 36 and energizing spring 38, shown schematically in FIG. 3. If the four sides of each wedging space can be closely filled, and fully enclosed, then the races 20 and 22 will be maintained coaxial, the rollers 36 will be strongly retained in place, and lubricant will be well retained around the rollers 36 and the race surfaces that they contact.

Figure 4:
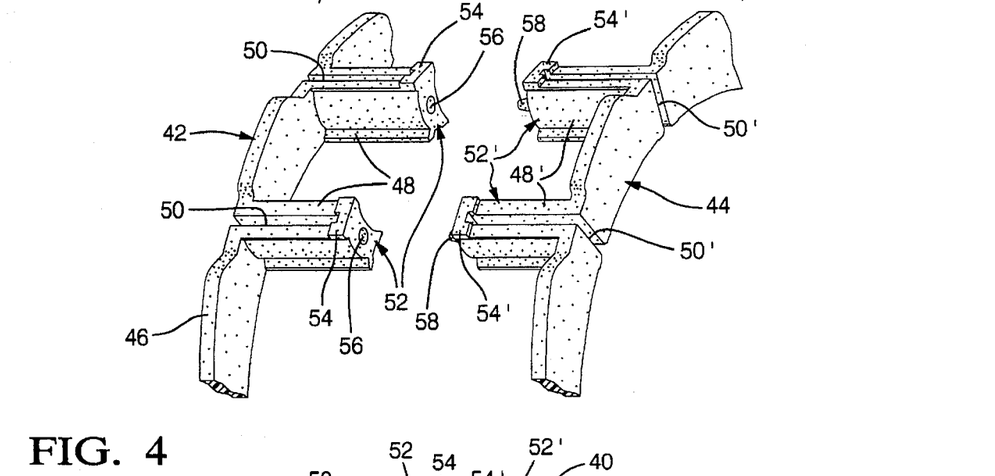
FIG. 4 is a perspective view of as much of a first embodiment of the invention as would fit between the segments of the races shown in FIG. 1, before the two cage segments have been assembled together.

Referring next to FIGS. 3 and 4, the invention provides a roller clutch cage, a first embodiment of which is indicated generally at 40, which achieves the objectives noted above, and which can also be simply manufactured and installed. Cage 40 includes the minimum possible number of constituent parts, two, that will still allow the parts to be integrally by pass molded. These are a first cage section, indicated generally at 42, and second section 44, which are basically mirror images of one another relative to the central plane Pc. The sections 42 and 44 can not be made exactly identical, because they ultimately fill the opposed sides A and B of the wedging space, which are asymmetrical. The sections 42 and 44 differ only in that respect, and in one other minor respect described below. Describing cage section 42 first, it is comprised of a series of circumferentially spaced side rails 46, each of which matches almost exactly, in shape and in radial and circumferential dimension, the arcuate side B of one wedging space. Side rail 46 is axially much thinner than the wedging space, of course, since the rollers 36 have to be ultimately accommodated end to end in cage pockets. Side rail 46 is radially solid and uninterrupted, but is circumferentially spaced from each adjacent side rail 46 by a pair of bounding cross bars 48, each of which is centered on the wedging space sides C and D. Each cross bar 48 is radially solid, with a radial thickness substantially equal to Rs, and, in the embodiment 40, an axial length half as long as the wedging space sides C and D. The cross bars 48 are not solid in the circumferential direction, however. Each cross bar 48 is cut by a slot 50 that extends axially inwardly as far as a closed inner end provided by solid end lug 52. The end lug 52, though solid, does not have a greatest radial thickness equal to Rs, as does the rest of the cross bar 48. The outer end of each slot 50 opens between adjacent side rails 46, thereby spacing the side rails 46 apart. In addition, in the embodiment 40, each end lug 52 has a short, radially outwardly extending barb 54 molded thereto, into which the slot 50 slightly axially intrudes. Finally, a tapered pin hole 56 is molded in the center of each cross bar end lug 52, collinear to the slot 50.

Figure 5:
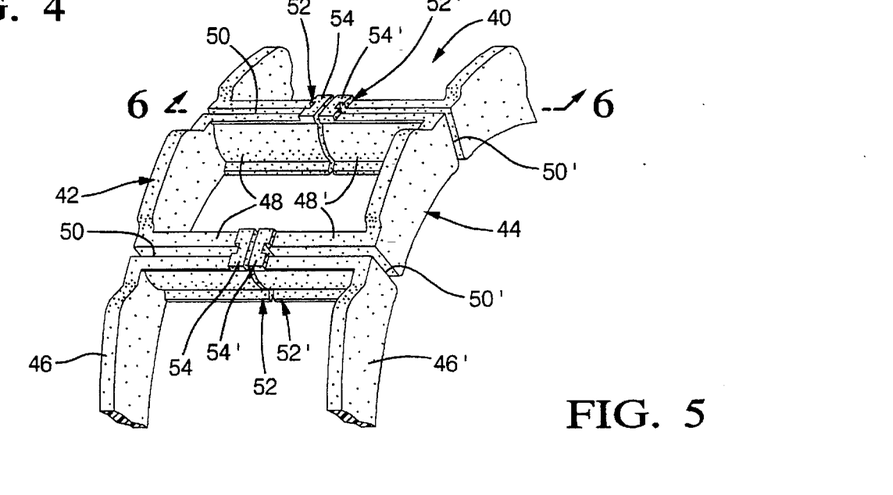
FIG. 5 shows the cage sections of FIG. 4 assembled together to complete the cage, before the rollers and springs are added to complete the roller clutch.
Figure 6:
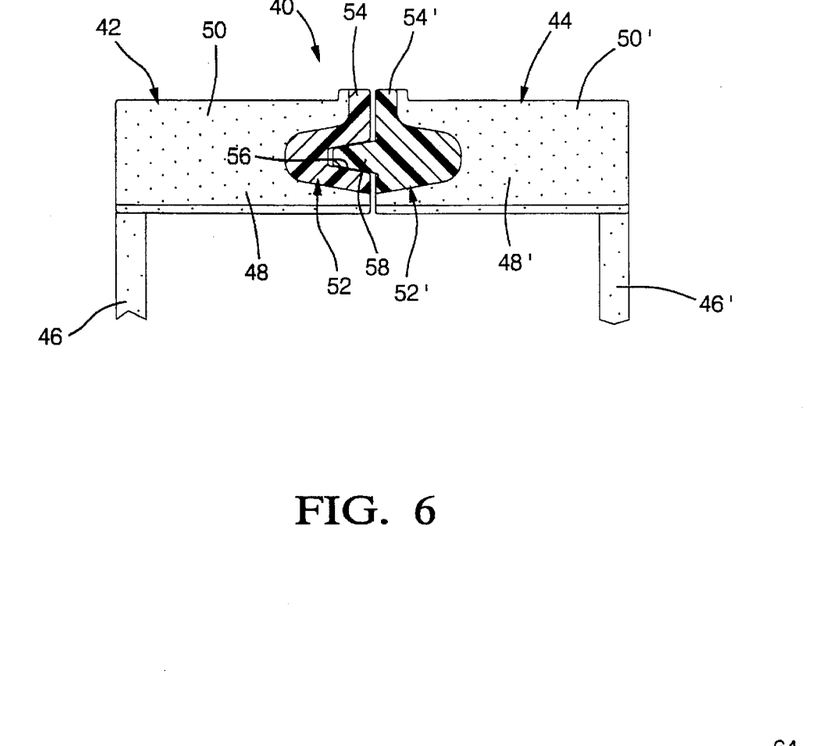
FIG. 6 is a cross section of the cage taken in the plane represented by the line 6—6 in FIG. 5.

Referring next to FIGS. 4 through 6, the second cage section 44 may be more briefly described, because of its basic similarity to first section 42. Second cage section 44 has the same cross bars, slots, end lugs and barbs as first section 42, which are all designated with the same number primed. The side rails 46' have the same shape and size as side rails 46 but, again, are mirror images thereof, rather than exactly identical. The only other different feature is that the end lugs 52' include an axially protruding tapered pin 58, which matches the tapered hole 56 in size and location. The second cage section side rail 46' corresponds to side A of the wedging space, just as side rail 46 does to side B. Given this mirror image (about the center plane Pc) relationship of the cage sections 42 and 44, they can be assembled together with a simple angular alignment and axial push. The tapered pins 58 enter the holes 56, as shown in FIGS. 5 and 6, until the cross bar end lugs 52 and 52' contact. The abutted cross bars 48 and 48' then form, in conjunction with the side rails 46 and 46', complete four sided roller pockets, the edges of which will conform closely to all four sides of the wedging spaces. The barbs 54 and 54' abut back to back, and together have an axial width less than the axial width of the cam race groove 30, for a reason described below. The pins 58 and holes 56 do not provide a great deal of pull apart resistance, but they need not, as will appear below.

Figure 7:
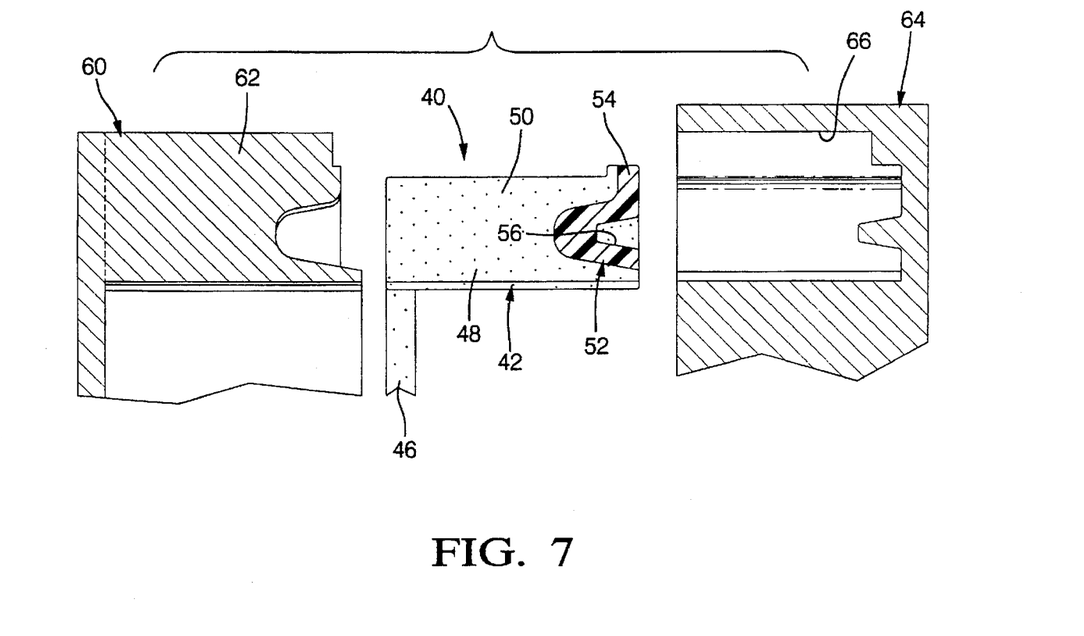
FIG. 7 is the same cross section of one cage section as shown in FIG. 6, flanked by the corresponding cross sections of the molds that produce it.

Referring next to FIGS. 6 and 7, the manner in which each cage section 42 and 44 is manufactured is described. As seen in FIG. 6, the opposed side rails 46 and 46' of the completed cage 40 all completely radially overlap with one another. For the individual cage sections 42 and 44, however, none of the outer surfaces facing in one axial direction radially overlap with, or are blocked by, the outer surfaces facing in the opposite axial direction. This characteristic surface relationship is made possible basically by the orientation of the slots 50 and 50' As a consequence, it is feasible to by pass mold each cage section 42 and 44. As seen in FIG. 7, each cage sections 42 and 44 (42 being illustrated) is molded between only two molds that part along the central axis of cage 40. A "male" mold, indicated generally at 60, includes long, thin blades 62, the profile of which matches the slot 50 and the back surfaces of the end lug 52 and barb 54. A "female" mold, indicated generally at 64, has deep cavities 66, the profile of which matches the outer surfaces of the cross bars 48, the tapered holes 56, and the front surfaces of the end lugs 52 and barbs 54. The surfaces of the molds 60 and 64 not shown in the FIG. 7 cross section match the outer and inner surfaces respectively of the side rails 46. When the molds 60 and 64 close, the blades 62 push into the center of the cavities 66 with clearance, leaving an empty space that exactly corresponds to, and produces when filled, the shape of the cross bars 48. The rest of the surfaces of the molds 60 and 64 produce the side rails 46. A suitable molten plastic material is then injected, such as high strength phenolic or glass filled nylon, allowed to harden. The molds 60 and 64 are then parted as shown. Similar molds would be used to mold the second cage section 44.

Figure 8:
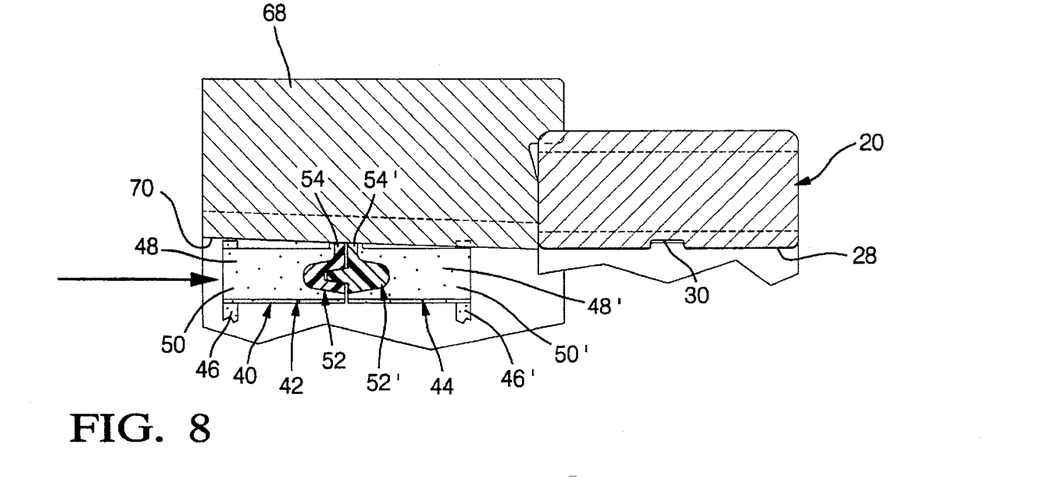
FIG. 8 shows the same cross section of the cage as FIG. 6, but without the rollers and springs, in the process of being initially installed to the cam race.
Figure 9:
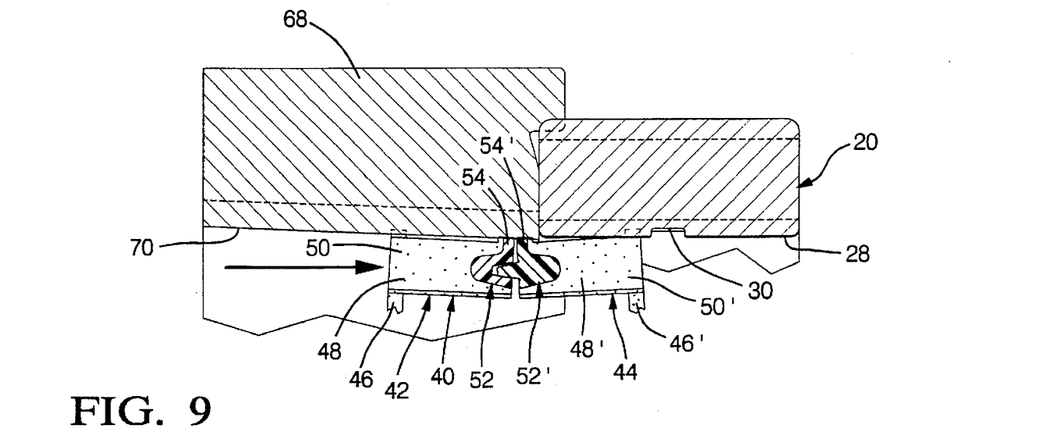
FIG. 9 shows the cage farther along in the installation process.
Figure 10:
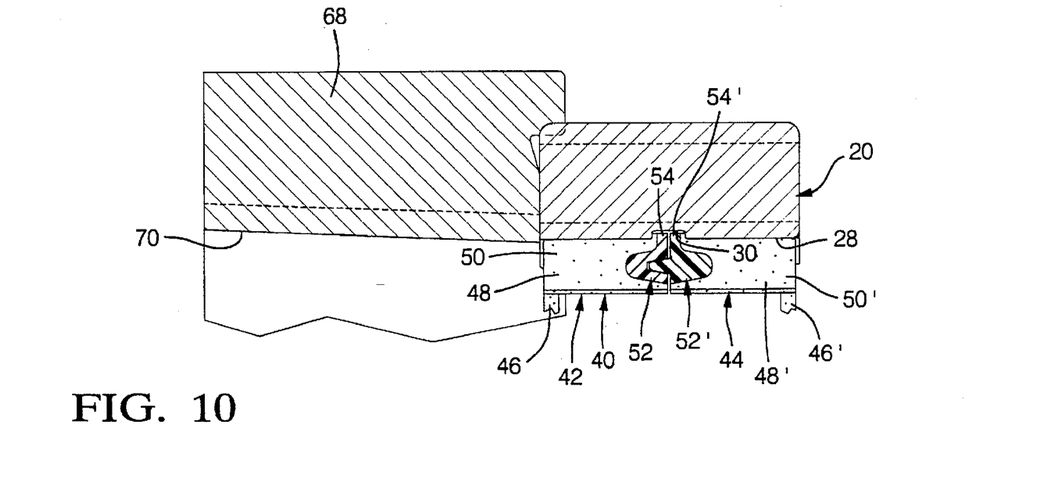
FIG. 10 shows the cage fully installed to the cam race.
Figures 11, 12:
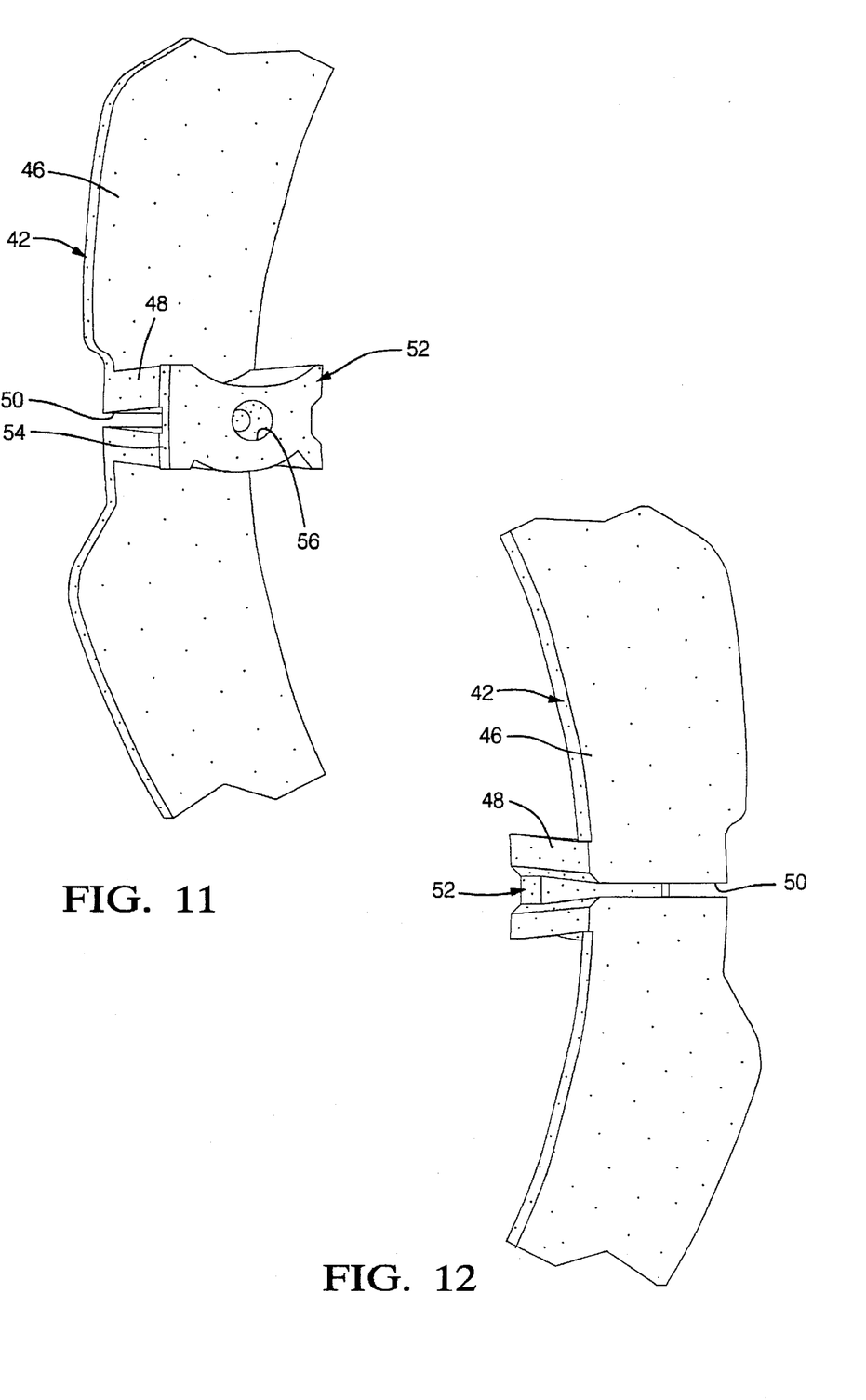
FIG. 11 is a perspective view of a cage cross bar of one cage section looking axially outwardly, illustrating how the slot allows the cage to effectively contract as it is installed.
FIG. 12 is the same view as FIG. 11, but looking axially inwardly.

Referring next to FIGS. 8 through 12, the installation of cage 40 to cam race 20 is illustrated. For simplicity, cage 40 is depicted without rollers 36 or springs 38, but it should be understood that they would be assembled to the cage pockets first, in actual practice, before cage 40 was installed. A guide ring, indicated generally at 68, has an inner surface 70 the profile of which generally matches the profile of the inner surface of cam race 20, including the cam ramps 24, cam hooks 26, and bearing surfaces 28. However, the guide ring inner surface 70 tapers from left to right, moving from a size slightly larger than the inner surface of cam race 20 to a size that substantially equals it. Therefore, as shown in FIGS. 8 and 9, when the guide ring 68 is angularly aligned with and held against the face of the cam race 20, it is possible to funnel and guide the cage 40 toward and ultimately inside of the cam race 20, properly aligned and oriented. The cage 40 is simply pushed through the guide ring inner surface 70 from left to right, indicated by the arrow. As this occurs, the abutted barbs 54 and 54', which extend radially past the envelope of the cam race bearing surfaces 28, are compressed radially inwardly by the guide ring's surface 70, bending the cross bars 48 and 48' inwardly at their centers about their juncture with the side rails 46 and 46'. As seen in FIGS. 11 and 12, the feature which gives each cross bar 48 or 48' the requisite flexibility to bend relative to a side rails 46 or 46' is the same slot 50 and 50' that allows by pass molding. FIGS. 11 and 12 illustrate first cage section 42 only, although the same reaction occurs in cage section 44. As the cage 40 is pushed in, the pins 58 remain in the holes 56, though they may part slightly. Simultaneously, the slots 50 (or 50') contract circumferentially and close up, pinching inwardly. The compression of the slots 50 is uneven, concentrated more toward the juncture of the cross bars 48 with the side rails 46, giving the compressed slots 50 a slightly trapezoidal shape. The flexibility given to the cage 40 by the compressible slots 50 (and 50') also serves to compensate for any tolerance mismatch between the shape of the outer edges of the side rails 46 (and 46') and the V shaped notches of the cam race 20. This allows the very close conformation of the cage 40 to cam race 20. Were the side rails 46 and 46' solid and inflexible in the circumferential direction, as a solid metal stamping would be, any tolerance caused mismatch could cause cage 40 to bind up when it was pushed on to cam race 20. When the abutted barbs 54–54' reach the cam race grooves 30, they snap out and into them, and the cross bars 48 (and 48') flex back out. Cage 40 is now effectively axially aligned with and self retained to cam race 20, with no extra securement means needed. Likewise, the pins 58 and holes 56 are no longer needed to retain the cage sections 42 and 44 together. Afterwards, pathway race 22 would be installed concentrically inside of cam race 20 and cage 40 by the conventional "ringing on" method described above.

Figure 13:
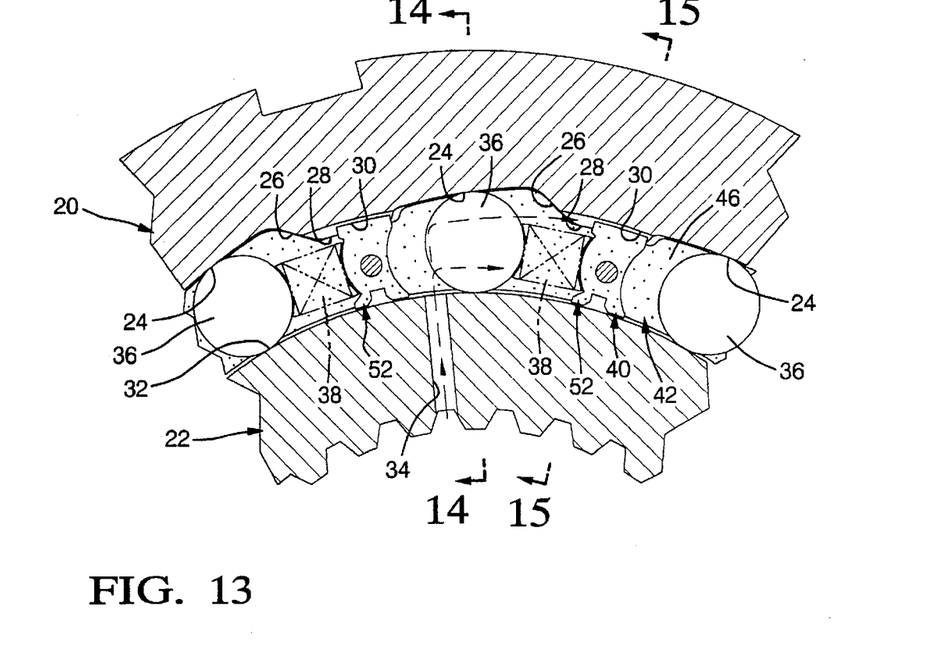
FIG. 13 is a cross section through the center plane of an installed roller clutch, showing the rollers in elevation, and indicating lubricant flow by arrows.
Figure 14:
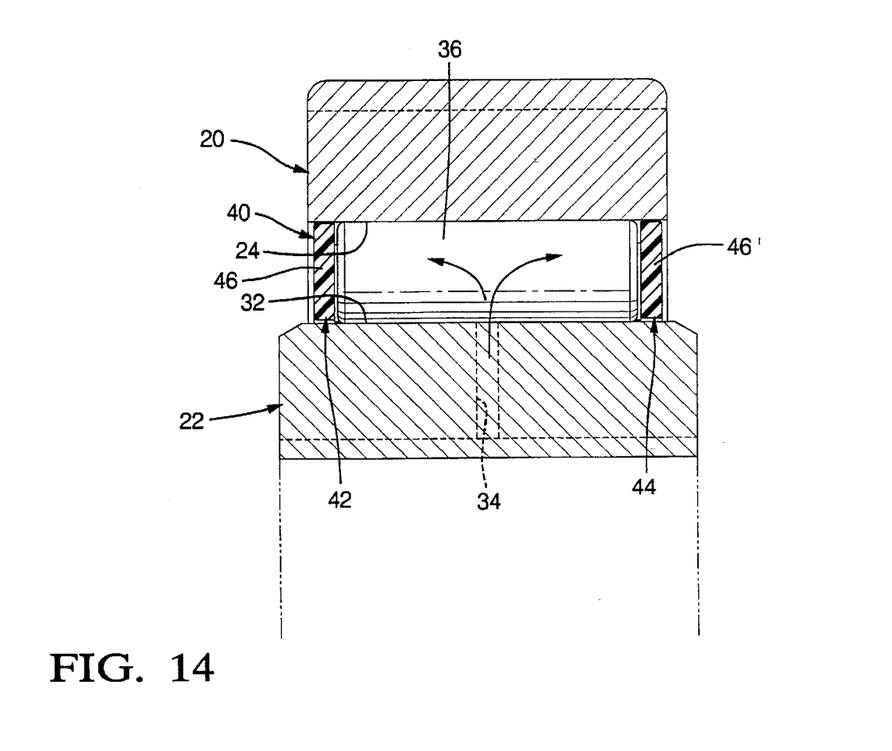
FIG. 14 is a cross section of the installed clutch taken in the plane represented by the line 14—14 of FIG. 13, and also showing lubricant flow by arrows.

Referring next to FIGS. 13 and 14, certain operational advantages that flow from the full profile, radially solid nature of cage 40 may be seen. Once the pathway race 22 has been installed, the roller pockets, specifically, the cage side rails 46 (and 46') and cross bars 48 (and 48'), substantially fill all four sides of the wedging space A–D. The abutted cross bars 48 and 48' maintain the cam race bearing surfaces 28 properly radially spaced relative to the pathway 32, as conventional solid bearing blocks would do. In addition, the outer and inner edges of the side rails 46 and 46', by closely conforming both to the cam ramps 24 and cam hooks 26 of the cam race 20, and to the pathway 32, assist in keeping the races 20 and 22 concentric. Therefore, all parts of the cage 40, not just some, serve to solidly maintain the races 20 and 22 in a concentric, coaxial relationship during dynamic operation. There is inevitably some radial clearance between the edges of the cage 40 and the surfaces of the races 20 and 22, however, which causes them to run slightly eccentrically, rather that absolutely concentrically. The cage flexibility provided by the slots 50 and 50', which assisted in installation, also allows the cage 40 to dynamically conform itself to and between the eccentrically running races 20 and 22. That same running eccentricity causes the rollers 36 to continually roll rapidly back and forth on the cam ramps 24 and, should any skewing occur between the axes of the races 20 and 22, the ends of the rollers can be axially forced into the cage side rails 46 and 46' strongly. The radial solidity and full radial width of the side rails 46 and 46' provides better axial confinement of the rollers 36 when this occurs.

Figure 15:
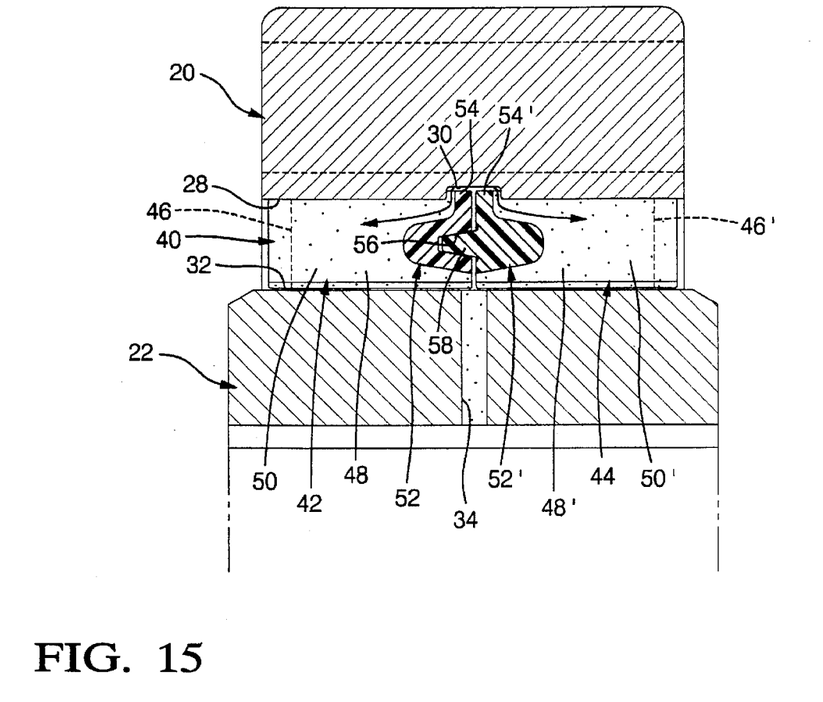
FIG. 15 is a cross section of the installed clutch taken in the plane represented by the line 15—15 of FIG. 13, and also showing lubricant flow by arrows.

Referring next to FIGS. 13–15, a further operational advantage that flows from the shape and size of the cage 40 is illustrated. The full radial width and uninterrupted nature of the axially opposed side rails 46–46', and of the circumferentially opposed abutted cross bars 48–48', serve to completely enclose and surround the wedging spaces around the rollers 36. Lubricant which is pumped radially outwardly through the pathway race supply holes 34 under pressure enters between the side rails 46–46'. Since the pathway race 22 turns relative to the cam race 20 at all times, except during clutch lock up, four supply holes 34 are sufficient to distribute lubricant to the entire surface of cam race 20. The lubricant so supplied is blocked against axial egress by the side rails 46 and 46', as shown by the arrows in FIG. 14. Consequently, the lubricant is more likely to be retained around the various rubbing interfaces, such as that of rollers 36 to cam ramps 24. If lubricant were completely axially retained, however, it might put too much outward pressure on the side rails 46 and 46', tending to bulge them apart. This is prevented by a controlled axial drainage to the outside. Lubricant under pressure can enter the cam race grooves 30 and flow therethrough. Since the slots 50 and 50' do intrude axially slightly into the abutted barbs 54–54', which do not totally block the grooves 30, lubricant can thereby drain to the outside in a controlled fashion, as shown by the arrows in FIG. 15. Finally, the same slots 50 and 50' also allow the cage 40 to expand or contract to compensate for the differential expansion and contraction that can occur between the steel races 20 and 22, and the plastic cage 40.

Figure 16:
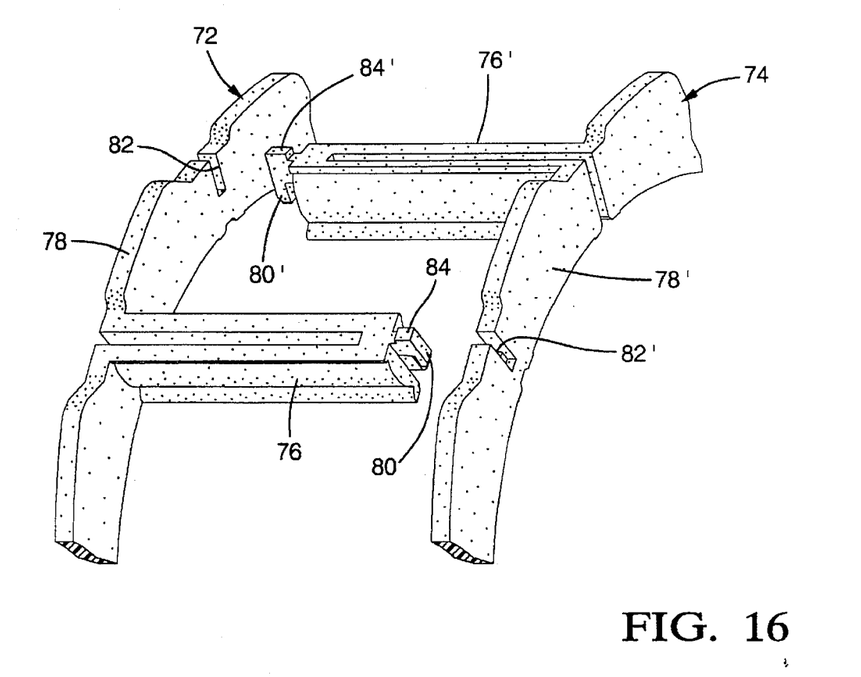
FIG. 16 is a perspective view similar to FIG. 4, but showing a second possible embodiment for the cage sections.

Thus, the basic cage design of two mirror imaged cage sections 42 and 44, each made up of a series full profile cage side rails 46 and 46', spaced apart and connected by axially slotted cross bars 48–48', provides advantages in terms of manufacture, installation, and dynamic operation. The same basic advantages can be embodied in a different structure, as seen in FIG. 16. An alternate embodiment of the cage is also comprised of two mirror image cage sections, indicated generally at 72 and 74. The cage sections 72 and 74 are even more similar to one another than in the first embodiment 40, differing only because of the asymmetry of the surface profile of the cam race 20. Unlike the first embodiment 40, the slotted cross bars, indicated at 76 and 76', extend for the entire axial width of the wedging space, not half, and the side rails 78 and 78' subtend enough angle to encompass two complete adjacent wedging spaces, not one. As a consequence, the ends of the cross bars 76 and 76' can be molded with hooks 80, 80' to latch directly into notches 82 and 82' on the side rails 78 and 78'. The cage sections 72 and 74 can be molded and assembled in the same way, producing the same size and number of roller pockets, and also installed to the cam race 20 in the same fashion. The full profile, radially solid side rails 78 and 78' completely fill the arcuate sides of the wedging spaces in the same manner to keep the races 20 and 22 coaxial. There are no central abutted barbs like 54 and 54' to snap fit into a central cam race groove 30 for self retention. However, equivalent single barbs 84 and 84' could be molded just above the hooks 80 and 80', which could snap into two axially spaced cam race grooves, not illustrated. The consideration that would drive the choice of the full length, cross bar 76–76' design as opposed to the half length, end to end abutted cross bar 48–48' design, would be ease of molding. With axially wider cam races (and wedging spaces), the projecting mold blades needed to create full length slotted cross bars will become longer and, consequently more flexible and difficult to control. The use of two half length, abutted cross bars, like 48–48', obviates that potential molding difficulty, with no loss in other advantages. Both embodiments could be altered for other applications. In applications where axial cage retention could be provided by other structures that were axially adjacent to the races 20 and 22, cage self retention structures would be unnecessary. Barbs like 54 (54') do cooperate well with the cage contraction that the slotted cross bars 48 (48') provide during cage installation, however, and are no more difficult to mold. Other means could be used to latch the two cage sections together, including additional assembly operations, such as sonic welding. It is more cost effective to provide a latch means integrally molded to the free ends of the cross bars, however, and the examples of such illustrated here, such as the pins 58 and hooks 80 can be easily molded and engaged. Therefore, it will be understood that it is not intended to limit the invention to just the embodiments disclosed.

I claim:

1. A roller clutch cage adapted to be installed between a pair of clutch races that define a series of circumferentially spaced, discrete, four sided wedging spaces therebetween when coaxially disposed, each wedging space having a pair of parallel, circumferentially extending arcuate sides with a predetermined radial thickness and profile and a pair of substantially parallel, axially extending straight sides having a predetermined axial depth and radial thickness, said cage comprising, a pair of one piece, substantially mirror imaged cage sections, each cage section comprising a series of circumferentially spaced, radially solid side rails having a radial thickness and profile substantially matching that of the arcuate sides of the wedging spaces, each side rail being bounded by a pair of axially extending cross bars having a radial thickness substantially equal to a straight side of said wedging spaces, each cross bar having an axially outwardly opening slot therein separating adjacent side rails and running substantially the entire length of said cross bar to a solid end lug, so that each cage section can be integrally molded by a single pair of axially parting molds, and means for connecting said cross bar end lugs on one cage section to the other cage section to complete said cage, thereby forming a series of circumferentially spaced, four sided pockets, each of which pockets fits within a wedging space and substantially fills and encloses all four sides thereof when said cage is installed, whereby, said races are fully supported in substantially coaxial relation.

2. A roller clutch cage according to claim 1, wherein the means for connecting said cage sections includes a latch means integrally molded to the end lugs of one cage section cross bars that is engageable with the other cage section.

* * * * *